(12) United States Patent
Schott et al.

(10) Patent No.: US 7,987,151 B2
(45) Date of Patent: Jul. 26, 2011

(54) APPARATUS AND METHOD FOR PROBLEM SOLVING USING INTELLIGENT AGENTS

(75) Inventors: Wade F. Schott, Santa Clara, CA (US); Thanh A. Diep, Vancouver, WA (US)

(73) Assignee: General Dynamics Advanced Info Systems, Inc., Arlington, VA (US)

( * ) Notice: Subject to any disclaimer, the term of this patent is extended or adjusted under 35 U.S.C. 154(b) by 740 days.

(21) Appl. No.: 11/066,332

(22) Filed: Feb. 25, 2005

(65) Prior Publication Data

US 2010/0185566 A1    Jul. 22, 2010

Related U.S. Application Data

(63) Continuation-in-part of application No. 09/927,826, filed on Aug. 10, 2001, now abandoned.

(51) Int. Cl.
*G06N 5/00* (2006.01)
(52) U.S. Cl. ............................................. 706/62; 706/45
(58) Field of Classification Search .................. 706/59, 706/45, 62; 719/317
See application file for complete search history.

(56) References Cited

U.S. PATENT DOCUMENTS

| | | | | |
|---|---|---|---|---|
| 5,638,494 | A * | 6/1997 | Pinard et al. ................... | 709/202 |
| 5,748,974 | A * | 5/1998 | Johnson ............................ | 704/9 |
| 5,974,444 | A * | 10/1999 | Konrad .......................... | 709/203 |
| 6,292,830 | B1 * | 9/2001 | Taylor et al. ................... | 709/224 |
| 6,353,814 | B1 * | 3/2002 | Weng .............................. | 706/12 |
| 6,615,172 | B1 * | 9/2003 | Bennett et al. ................. | 704/257 |
| 6,812,937 | B1 * | 11/2004 | Abbott et al. .................. | 715/740 |
| 6,842,877 | B2 * | 1/2005 | Robarts et al. ................. | 715/708 |
| 7,069,560 | B1 * | 6/2006 | Cheyer et al. .................. | 719/317 |
| 7,092,928 | B1 * | 8/2006 | Elad et al. ......................... | 706/60 |
| 2001/0042057 | A1 * | 11/2001 | Ikebe et al. ..................... | 706/11 |
| 2002/0147627 | A1 * | 10/2002 | Roosevelt et al. .............. | 705/10 |

OTHER PUBLICATIONS

Chen et al. "A Logical Approach to High-Level Agent Control". May 28, 2001, ACM, Agents '01. pp. 1-8.*
Chen et al. "A Logical Approach to High Level Agent Control". May 28, 2001, ACM, Agents '01, pp. 1-8.*

* cited by examiner

*Primary Examiner* — Wilbert L Starks, Jr.
(74) *Attorney, Agent, or Firm* — Ingrassia Fisher & Lorenz, P.C.

(57) ABSTRACT

The present invention relates to a system and method for problem solving using intelligent agents. The intelligent agents may be embodied as processor-readable software code stored on a processor-readable medium. The intelligent agents may include a brain agent to parse the input and direct the parsed input query to other intelligent agents within the system. The apparatus and method may use, for example, a personality agent, a language agent, a knowledge agent, a mood agent, a visual agent, sound agent, a tactile agent, and a smell/taste agent and various connectors to external data sources or other intelligent systems to interpret questions and provide responses back to the user. The apparatus and method may further parse questions in a conceptual manner. The apparatus and method may further optimize its system performance by evolving with and reacting to specific user interactions. Thus, the present invention may be configured to receive a human question and to output a human answer.

20 Claims, 9 Drawing Sheets

APPARATUS AND METHOD FOR PROBLEM SOLVING USING INTELLIGENT AGENTS

CROSS-REFERENCE TO RELATED APPLICATIONS

This application is a continuation-in-part application of U.S. patent application Ser. No. 09/927,826, entitled "Apparatus and Method for Problem Solving Using Intelligent Agents", filed on Aug. 10, 2001, now abandoned which is hereby incorporated by reference in its entirety.

FIELD OF THE INVENTION

The present invention relates generally to artificial or machine intelligence. More specifically, the present invention relates to a system and method for problem solving using intelligent agents.

BACKGROUND OF THE INVENTION

With the rapid increase in usage of the Internet in recent times, people are turning to computers for answers to everyday questions in the form of natural language with ever increasing regularity. Artificial or machine intelligence has been under development for many years, but is now gaining attention from the general public as Web sites such as Askjeeves.com allow users to input questions to obtain desired information. Another such example is SynTactic Analysis using Reversible Transformations ("START"), that was developed at MIT's Artificial Intelligence Laboratory. Connected to the World Wide Web since December, 1993, START is a software system designed to answer questions that are posed to it in natural language. START uses a special form of annotations to perform text retrieval. An example of such annotations to perform text retrieval is provided in U.S. Pat. No. 5,309,359 to Katz et al. Another similar system is CYCORP'S "CYC" system. CYC provides the capability for answering natural language questions using its proprietary knowledge base. While CYC uses an agent-based architecture, the intelligent agents are of the same type, working in parallel to cover different "knowledge" space.

However, no artificial or computer intelligence systems presently available utilize individual components, each with a dedicated function, that collaborate with one another to help interpret a user's input and construct a response. Conventional systems presently available likewise do not parse a user's input in a conceptual manner. In addition, conventional systems presently available do not include characteristics specific to the individual asking the question when interpreting the question and constructing a response to the question.

Therefore, it would be desirable to provide an artificial intelligence system that utilizes components that are dedicated to specific tasks and collaborate with one another to help interpret a user's input and to generate responses to the user's input. It likewise would be desirable to provide an artificial intelligence system that parses input in a conceptual, rather than grammatical, manner. Additionally, it would be desirable to provide an artificial intelligence system that utilizes characteristics specific to the individual user when generating responses to the user's input.

SUMMARY OF THE INVENTION

The present invention is directed to a system and a method for problem solving. More particularly, the present invention is directed to a system and method for receiving an input query having various data types, such as, for example, visual data, sound data, and tactile data, and for providing output based on the input query using various intelligent agents.

According to one exemplary embodiment of the invention, a system for problem solving may include a brain agent. The brain agent may be configured to receive input data representing an input query from a peripheral device. The brain agent may be configured as processor-readable software code stored on a processor readable medium. The brain agent may be configured to identify a predetermined data format associated with the input data and invoke a decomposition process associated with that predetermined data format. According to one embodiment of the invention, the decomposition step may include outputting the data to a first intelligent agent. The first intelligent agent may be configured as processor-readable software code stored on a computer readable medium. The first intelligent agent may be configured to receive the input data in a textual form and conceptually parse the input data. A second intelligent agent may be configured to receive the conceptually parsed text and provide output to the brain agent based on the conceptually parsed text.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

Figure 1:
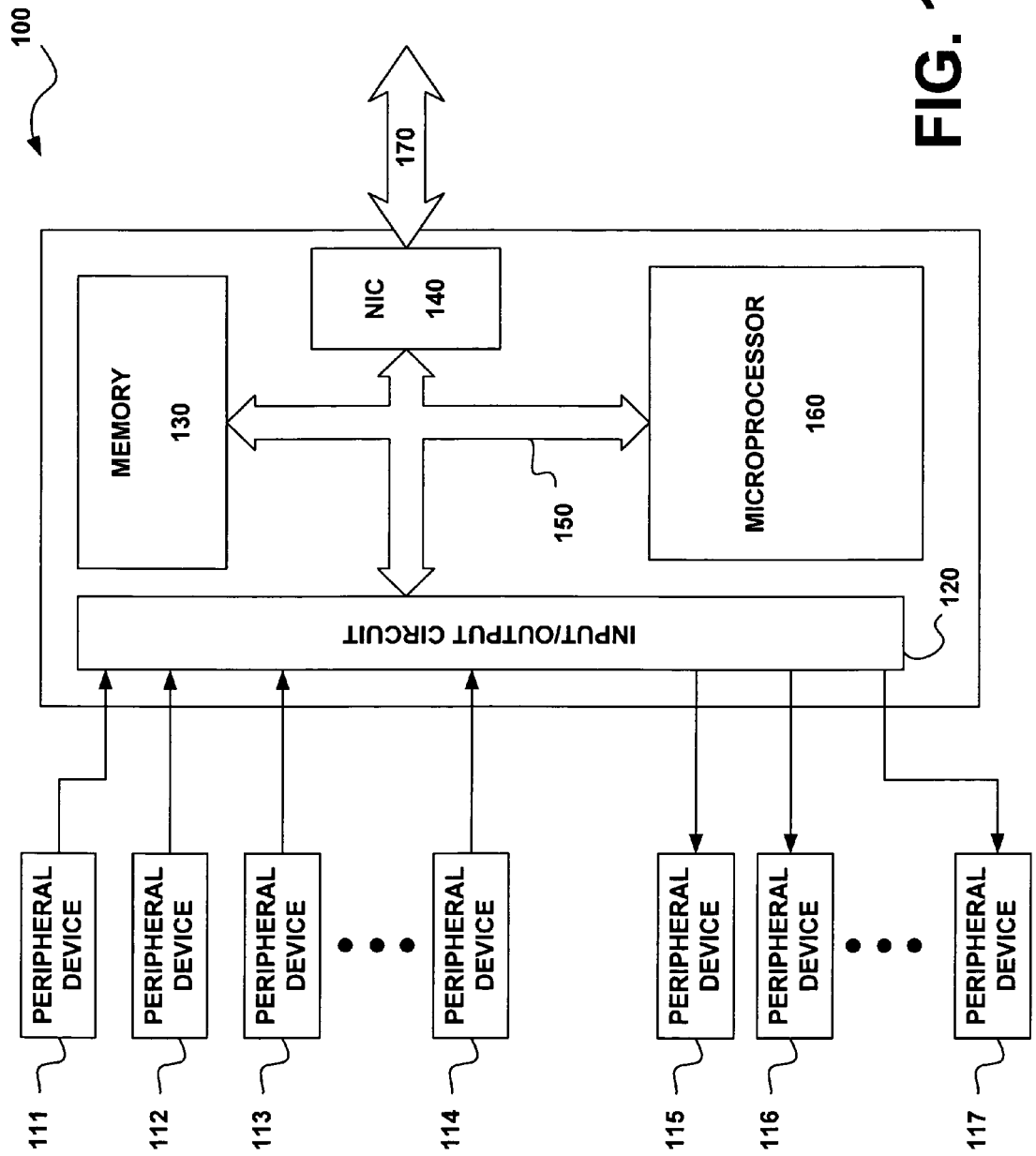
FIG. 1 shows a functional block diagram of a system that may be configured to solve problems using intelligent agents.

The present disclosure will now be described more fully with reference the to the Figures in which various embodiments of the present invention are shown. The subject matter of this disclosure may, however, be embodied in many different forms and should not be construed as being limited to the embodiments set forth herein.

The present invention is directed to a system and a method that may be configured to receive an input query or question that is posed in natural language syntax, or a question that is phrased in natural language syntax that is coupled with additional information (e.g., video, sound, tactile, etc), or any other input to which a response may be provided (i.e., a "human question") and may be configured to output a response that also is in natural language syntax, in natural language syntax coupled with additional data, or another other form of output that can be understood by a human ("human answer"). The input can be in any language and can be in a variety of media, including without limitation: sound, video, optical character recognition ("OCR") and text. Input in the form of text may include, without limitation, data entered using a keyboard, the content of a text or other data file (e.g., HTML, XML, JAVA, C++etc.), and reference to the content of a file using the file name or a pointer such as, for example, a hyperlink (e.g., www.gd-ais.com). The text input used with the present invention likewise may be in various formats including, without limitation, pdf files, MICROSOFT documents, and structured files. The output likewise can be in any language and can be in a variety of media, including, without limitation, voice, video, and text.

As detailed below, the present invention may be configured to utilize one or more intelligent agents to output a human answer in response to a human question that may be input by an end user. Each intelligent agent may be configured to perform a specific task, but all of the intelligent agents operate according to the same underlying principle: to decompose the human question into one or more "simplified" questions that can be answered by machine intelligence ("machine actionable questions"). As detailed below, each intelligent agent may be dedicated to decompose the human question according to the specific function of the intelligent agent, with a brain agent configured to coordinate the activities of the other intelligent agents.

The human question may be decomposed in a manner that removes the "human" interpreting elements of the question to reduce the question to factual inquires that can be solved by machine intelligence. This may be done by a process including parsing, normalization and scoring processes, as will be described in more detail below. Each intelligent agent may optionally employ an error-handling agent to compensate for errors or ambiguities in the human question. This error-handling agent will be described in more detail below. In addition, each intelligent agent may employ one or more connectors. Connectors may be embodied as computer software programs. These connectors may be configured to serve the function of interfacing external databases or other intelligent agents or systems that may have, for example, different syntax, data formats, and protocols. The connectors may be configured to permit the various intelligent agents to access these external data sources and to permit the data from the other data sources to be understood by the intelligent agents. Thus, connectors may be algorithms implemented as computer software that enable the intelligent agent to communicate with external data sources, including external intelligent systems. Thus, the system may be configured to permit collaboration between intelligent systems. Although each intelligent agent may interface with outside sources using its own connector, according to one embodiment of the present invention, one set of connectors may interface with the brain agent, and the other intelligent agents may be configured to access outside sources through the connectors interfaced with the brain agent.

FIG. 1 shows a functional block diagram of a system that may be configured to solve problems using intelligent agents. According to the exemplary embodiment of the system for providing output based on input queries using intelligent agents 100, a number of input peripheral devices 111, 112, 113, and 114 may be provided so as to be in communication with an input/output (I/O) interface circuit 120. The I/O interface circuit 120 may be, for example, within a computer. A number of different I/O interface circuits 120 may be incorporated within the present invention and may include, analog-to-digital conversion circuitry, signal conditioning circuitry, and various other types of I/O circuitry as will be readily apparent to one of skill in the art as circuitry for facilitating the input of analog, digital, or even pulse width modulated input signals.

The input peripherals 111, 112, 113, and 114, may include, for example, a keyboard, a microphone, a computer mouse, a heat sensor, optical scanners, chemical sensors, among a myriad of other possible sensors and other input peripherals. The particular type of input peripheral devices 111, 112, 113, and 114 that may be used in connection with the present invention will depend upon which of the intelligent agents are used in connection with a system of the present invention. The various intelligent agents and the particular types of input peripherals 111, 112, 113, and 114, that may be used in connection with a given intelligent agent will be described in further detail below as each particular intelligent agent is discussed.

According to one exemplary embodiment of the invention, the system may be configured to interface with a computer network or a telephone network permitting a user to electronically message or place a telephone call to the system to obtain the answer to a particular question. Thus, a user may call the system and obtain answers regardless of their proximity to the system. The system may be configured to perform the login process automatically based on the identification of the telephone number using a type of caller ID system and may load the user's profile and preferences based on that information.

As discussed above, the peripheral devices 111, 112, 113, and 114, may be configured to be in communication with an I/O circuit 120. As used herein, the term "in communication with" is intended to mean that the two devices are able to exchange data from one device to another (i.e., one way communication) or between devices (two-way communication) and that exchange of data may be performed via a communication bus or even a wireless communications channel.

Once data from at least one of the peripheral devices is received at the I/O circuitry 120, the I/O circuitry 120 relays that information to the brain agent (not shown). The brain agent may be embodied as a processor-readable software code stored on a processor readable medium, such as, for example, a diskette, an optical storage medium, a magnetic storage medium, or a solid-state storage medium. The brain agent may include code to instruct the processor to perform various functions, including, for example, a parsing of the input into the system. The software may be stored on, for example, a memory 130, that is configured to be in communication with a microprocessor 160 via, for example, a bus 150. Once the input is received, the brain agent, and possibly other intelligent agents may be loaded from the memory so that the input may be parsed and the input query may be "answered appropriately". The system 100 may also include a means for interfacing with external databases and other sources of information, such as, for example, a network interface card ("NIC") 140. The NIC may be configured to be used by any one or more of the agents to retrieve data that may be used to answer the input query. Alternatively, the system may be configured to be coupled to any external systems through various means known in the art such as, for example, USB ports, serial interfaces, parallel ports, e-mail or other means for communicating (e.g., text messaging, instant messenger).

Once an answer to the input query has been determined by the applicable intelligent agents, each of the agents may be configured to output the relevant information back to the brain agent, which may be configured to assemble the data appropriately and output the answer to the question, via the I/O interface 120 to the output peripheral devices 115, 116, and 117. These output peripheral devices 115, 116, and 117, may include tactile feedback devices, visual output devices, and sound output devices. Various other output devices will be readily apparent to those skilled in the art. For example, the data can be output in processor-readable form and saved to a portable processor-readable medium. While multiple output devices are shown, it should be understood that any number of output devices may be utilized in connection with the present invention, including one output peripheral devices, or ten output peripheral devices depending on the nature of the feedback that a system developer would like to provide to the end user. This is also applicable to the input peripheral devices 111, 112, 113, and 114, which may include an appropriate number of peripheral devices depending on the number of intelligent agents that are desired to be employed in connection with an embodiment of the present invention, as well as the robustness of the output from the system.

Figure 2:
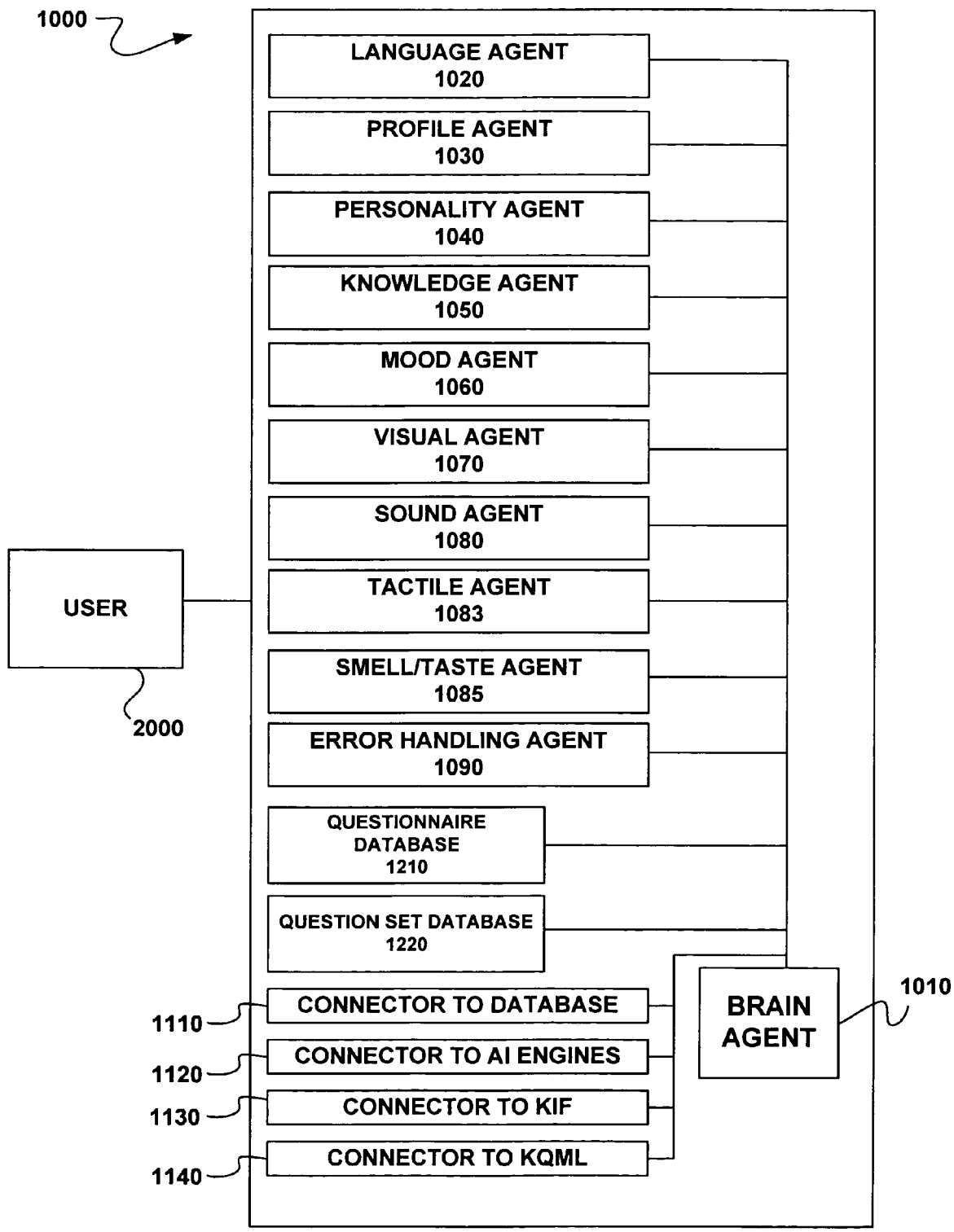
FIG. 2 shows a functional block diagram of a system having a number of different intelligent agents according to an exemplary embodiment of the invention.

FIG. 2 shows a functional block diagram of a system having a number of different intelligent agents according to an exemplary embodiment of the invention. As shown in FIG. 2, the present invention may include a brain agent 1010, and one or more of the following intelligent agents: a language agent 1020; a profile agent 1030; a personality agent 1040; a knowledge agent 1050; a mood agent 1060; a visual agent 1070; a sound agent 1080; a tactile agent 1083; a smell/taste agent 1085; and an error handling agent 1090. The present invention may further include one or more connectors to link the system 1000 with external data sources of information. These connectors may include, without limitation: a database connector 1110; an artificial intelligence ("AI") engine connector 1120; a Knowledge Interchange Format ("KIP") protocol connector 1130; and a Knowledge Query and Manipulation Language ("KQML") protocol connector 1140. The present invention also may include a questionnaire database 1210 and a question set database 1220. As would be known to those skilled in the art, while databases 1210 and 1220 are shown separately, they may both be part of the same component, depending on the desired design and possible design constraints such as, for example, cost. As provided in detail below, brain agent 1010 receives as input a human question from a user 2000 and coordinates the activities of the various agents to output a human answer to user 2000.

Immediately following is a detailed description of various components that may be employed in connection with various embodiments of the present invention. Then a description concerning the use of present invention is set forth.

1. Brain Agent

Brain agent 1010 may be configured to coordinate the activities of, and communication between the various intelligent agents employed in connection with the present invention. Brain agent 1010 may be configured to receive input from a user 2000, distribute that input to the appropriate intelligent agent or agents, output requests for feedback or further refinement of the user's human question when needed. In the event that the brain agent 1010 receives some input data that it does not 'understand', it will make a request to the appropriate intelligent agent to begin to break down the particular question and retrieve a portion of the answer. According to an exemplary embodiment of the present invention, the brain agent may be configured to utilize a scoring threshold to determine if a particular answer is reliable enough to output to a user. In other words, according to one exemplary embodiment of the present invention, the brain agent 1010 may be configured to receive a confidence factor that may be output by each of the intelligent agents in the system based on the reliability of the data retrieved based on the human question. This confidence factor may be based on data such as the status of the agent and the output of the agent. A low confidence factor may mean that the intelligent agent that is reporting the result is not confident about the particular result that it has come up with. According to one embodiment of the invention, the brain agent may be configured to generate composite scores from multiple scores from each of the individual agents. There are numerous methods for assessing the quality of feedback and the present invention is not intended to be limited as to how the particular scoring of the feedback from the various intelligent agents to the brain agent 1010 will be implemented. According to another exemplary embodiment of the present invention, the particular scoring threshold that is employed by the system may be determined on a training process and may be uniquely associated with a particular user. For example, the threshold for relevancy of a result may be different for an emergency room doctor as compared with a tenth grade student, the doctor requiring extreme precision in the results in some instances. Additionally, the degree of accuracy of the response may be modified by the mood agent or sound agent (e.g., the person asking the question is excited or distressed and needs rapid, accurate feedback). Various other systems for changing the threshold on the fly will be realized based on the current disclosure.

Brain agent 1010 may further include a database connector 1110, which may be configured to: connect one or more intelligent agents to other artificial intelligence ("AI") engines using an AI connector 1120, to connect one or more intelligent agents to other systems that use KIF protocol using KIF connector 1130, and/or to connect one or more intelligent agents to other systems that use KQML protocol using KQML connector 1140.

Following is a summary of the typical operation of brain agent 1010. The brain agent 1010 may be configured to turn the system on and off. Alternatively, the brain agent 1010 may be configured to change the state of the system from an idle state to an active state or vice versa. When the brain agent 1010 turns the system on, the brain agent 1010 may be configured to run tests on the peripheral devices to make sure that they are operating properly. Various other initialization processes, such as checking the memory and other hardware are also possible as will be appreciated by one of ordinary skill in the art.

Once the brain agent 1010 has been turned on and the initialization processes have been completed, the brain agent 1010 determines whether it is operating in one of a number of different modes. According to one exemplary aspect of the present invention, the state may be configured to operate in one of three modes: a training mode; a testing mode; and a usage mode. According to this exemplary embodiment, the training mode may be configured to learn a particular user's preferences, biases, personal information about the user, and the like. This may be performed by a type of interview process run by the brain agent 1010. According to one embodiment of the invention, when a new user logs into the system, the system may be configured to run the training agent by default. Optionally, a human teacher may be present to guide the program to produce more accurate results based on the human user's own observations and to ensure that the system is learning properly. The testing mode may include a mode where the system is being tested after it has completed the learning or training mode. The testing mode may involve, for example, either or both the user and the "teacher" to provide feedback to the system. Thus, the scores may be reviewed and the proper responses to particular questions may be ensured during the testing phase. The testing phase may include updates to a particular user's profile to ensure that it is properly designed prior to entering the use mode. The usage mode is the setting when the system is actually being used, i.e., it is not being tested or trained. The brain agent 1010 may also be configured to determine the role of the usage. For example, the brain agent 1010 may be configured to optimize its operation depending on which user is using the system, different optimizations may apply if the user has logged into the system using a guest setting. This permits the system to determine more readily what the appropriate output is for a particular user. Furthermore, the brain agent 1010 may also serve various ministerial functions, such as, for example, authenticating the user, as will be described in more detail below. Furthermore, the brain agent 1010 may be configured to keep logs and other relevant records.

Brain agent 1010 may receive a human question. Brain agent 1010 then may notify the various intelligent agents. One or more of the various intelligent agents examine the question. If appropriate, one or more of the intelligent agents communicates back to brain agent 1010 to relay information that may assist brain agent 1010 in interpreting the human question.

Various forms of information may flow to and from the brain agent 1010 from the various intelligent agents being employed in the system. Assume that a brain agent is being used in connection with three intelligent agents, each intelligent agent being designated with one of the variables "X", "Y", and "Z". After the system is turned on, the brain agent 1010 may be configured to obtain the peripheral status by sending a request for status information to each of the various individual intelligent agents, X, Y, and Z. Each of the intelligent agents X, Y, and Z, may be configured to receive this signal from the brain agent 1010 and may be configured to output peripheral status information back to the brain agent 1010. According to one exemplary embodiment of the present invention, the status information may include, for example, an indication that there is no peripheral detected, that the peripheral is not ready, that the peripheral is warming up, that the peripheral is in an error condition, or that the peripheral is ready for use. After the status of the various peripherals has been determined by the brain agent 1010 based on the feedback from the various intelligent agents, the brain agent 1010 may be configured to start the agent process. In order to start the agent process, the brain agent 1010 may be configured to relay data, parameters, and objectives to the agent. For example, the data may be a file, the parameters may tell the agent how to do a particular task, and the objectives define what that task is. Thus, the brain agent may send a data signal that is input into the system to the appropriate intelligent agent, X, Y, or Z depending on the particular type of data received. Thus, the brain agent may be configured to parse the data into various types of data and may send appropriate portions of the data to the appropriate intelligent agents.

After the various intelligent agents receive the data, each of the intelligent agents may be configured to return information on the status of the input information back to the brain agent 1010. For example, the intelligent agents may be configured to report back to the brain agent 1010 that the data is not valid, that there is missing data, that there are missing data parameters, that the data is being processed, etc. Variations on the reporting of the status of the data back to the brain agent will be readily apparent. Once the brain agent 1010 receives information back from one of the intelligent agents, the brain agent 1010 may be configured to output a signal to that particular intelligent agent to cease processing, or in other words, the brain agent 1010 may be configured to return a "stop agent process" command to the various intelligent agents after they have returned an answer to the portion of the input query that they were responsible for answering. Alternatively, the brain agent 1010 may be configured to issue a pause agent command to pause the processing of one or more intelligent agents. According to one exemplary embodiment of the present invention, the intelligent agents may be configured to be aware of when additional information is needed to answer a particular question. Thus, any one of the intelligent agents, X, Y, or Z may be configured to request additional information from the brain agent 1010. Thus, the intelligent agents may be configured to relay process status information to the brain agent 1010. Such process status information may include, for example, a request that more context be provided for the particular question, a request for more data, or a request for more parameters. As mentioned above, the parameters are the specifications on how to do a specific task, i.e., it is information that is sent by the brain agent to tell the intelligent agent how a particular task is to be performed.

According to another aspect of an embodiment of the present invention, the brain agent 1010 may be configured to instruct one or more of the intelligent agents to execute a predetermined mode, such as, for example, a mode "j", which may be configured to use a parameter ($p1, p2, \ldots pn$). In other words, different modes of operation can utilize different parameters, i.e., different methods of providing an answer to the same question depending on the mode. According to one embodiment of the present invention, the system may be asked to determined the color of an object and the velocity of a moving object. While according to an exemplary aspect of the present invention, these aspects may include the use of the same agent, i.e., the visual agent, they may invoke different modes to obtain the requested results, depending on the type of data requested based on the input query.

The resultant output from the intelligent agents is preferably the "answer" to a particular portion of a question. Thus, according to an exemplary embodiment of the present invention, the various intelligent agents may output the answer to the question, a score (or a confidence factor) relaying to the brain agent 1010 how close of a match a particular answer is, and the intelligent agent may relate the status of the agent to the brain agent 1010. While specific embodiments of the invention have been described herein as communications directly between the brain agent and the various intelligent agents X, Y, and Z, it should be readily understood that the intelligent agents may be configured to communicate with one another, particularly if there are no decisions to be performed based on the inquiries of one intelligent agent to another intelligent agent. This reduces the processing consumption of the intelligent agents. An exemplary implementation of this is shown in FIG. 3C, as will be discussed in more detail below.

For example, after a particular user logs into the system, the brain agent may be configured to access the profile of the particular user that is stored within a memory. Based on this profile, the brain agent 1010 may be configured to communicate with the appropriate agents, X, Y, and Z, to activate the appropriate sensors.

Decomposition

Figure 3A:
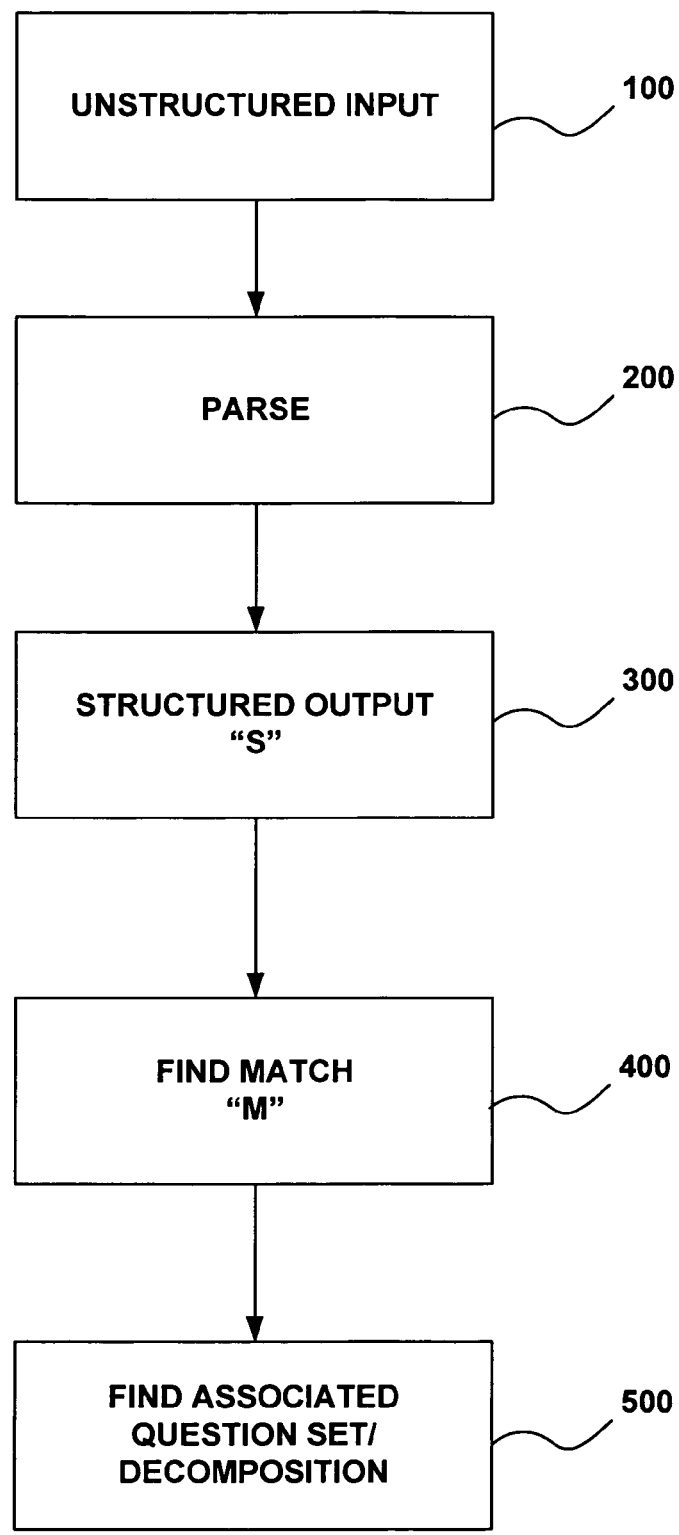
FIG. 3A is a flow diagram showing how one embodiment of the present invention may interpret a particular human question.
Figure 6:
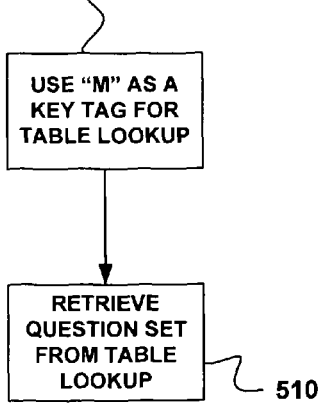
FIG. 6 shows a flow diagram of an exemplary form of decompression according to an embodiment of the present invention.

Referring to FIG. 3A, the process for interpreting the human question continues to step 500, where a question set associated with M is located. Step 500 is commonly referred to in the art as decomposition. According to one aspect of the present invention, the intent of the decomposition step may be both to decrease the complexity of the question and to interject knowledge by constructing a set of relevant and useful questions. As would be known by those skilled in the art, there are several ways to implement this decomposition step. Accordingly, the decomposition process of the present invention is not limited to the process shown in FIG. 6, as any appropriate decomposition method also may be used. Referring to FIG. 6, a preferred embodiment of the decomposition process (as discussed further below) is shown. The preferred embodiment of the decomposition process may be configured to use a table-look-up approach. For example, the table could be in the form of a question set database 1220 (shown in FIG. 2). Various other system implementations for performing comparisons and scoring are possible, and may be used in connection with the present invention. In step 505, the input key to the table is M (the parsed structured elements of the human question posed by user 2000). In Step 510, the table output may contain the parsed structured elements of a set of simpler questions or pointers to them. Brain agent 1010 then may be configured to notify the intelligent agents to retrieve the answers to the table output. For example, the question "What is the latest US population?" (M) would produce the following set of questions output from the table-lookup:

"What is the Asian population in US from the 2000 <latest> census?"

"What is the Hispanic population in US from the 2000 <latest> census?"

"What is the African-American population in US from the 2000 <latest> census?"

"What is the Caucasian population in US from the 2000 <latest> census?"

In this example, brain agent 1010 would then interact with knowledge agent 1050 to obtain the answers to the questions output from the lookup table. Typically, the human answer that is output to user 2000 would be the answers to the above questions that are output from the lookup table.

The above questions are written in the natural language format for ease of reading. In actuality, and as would be evident to one skilled in the art, the questions may be stored in the structured formats for easy searching and retrieval. Various other forms of storage of the data are possible and may be used in connection with the present invention.

The implementation of question set database 1220 may require manual entries by human experts of different fields. Alternatively, or additionally, the process may be semi-automated with the expert typing in questions in natural language format and with an engine converting them automatically into entries of structured format. Question set database 1220 also could be built piecewise by incrementally increasing subject coverage. Conceivably, the process could be completely automated by advanced software implementation.

In one of the final steps of the process, brain agent 1010 may be configured to piece together all of the information received from the various intelligent agents to form the human answer and to get feedback from user 2000.

In an alternate embodiment, the present invention could be dedicated only to the parsing of the human question, with the answer portion of the system delegated entirely to other external systems. In this embodiment, the components would still be as shown in FIG. 2, but they would be utilized only for parsing the human question. External components may be used to compose the human response to the human question. In another embodiment of the present invention that could utilize a hybrid approach, the system would interact with external systems to jointly construct a human answer to the human question. This embodiment also would appear as shown in FIG. 2. In yet another embodiment, the present invention would compose the human answer to the human questions internally, using external systems only during the parsing process. This embodiment also would appear as shown in FIG. 2.

Referring to FIG. 3A, a flow diagram is shown of an exemplary manner in which brain agent 1010 operates to interpret a human question. As would be known to those skilled in the art, the present invention is not limited to the flow diagram shown in FIG. 3A, as any appropriate method for interpreting a human question may be used according to the present invention. In step 100, brain agent 1010 receives a human question (query) input by user 2000. The human question is referred to as "Unstructured Input" in step 100. In step 200, the human question may be parsed. The parsing process will be described in more detail below with respect to FIG. 4. In step 300, the parsed information may be translated into a structured form, referred to as "S." Various structured forms may be used including Oracle databases or SQL databases. Numerous other structured forms may be used. In step 400, brain agent 1010 may try to match S with another structured form entry within questionnaire database 1210 (shown in FIG. 2). A match, if any, that is located during step 400 between S and another structured form entry is referred to as a "matched entry" or "M." In step 500, brain agent 1010 may be configured to determine a refined set of questions that are linked to M. Steps 200, 400, and 500 are described in further detail below. During each of the steps shown in FIG. 3A, brain agent 1010 may interact with one or more of the other intelligent agents, as appropriate, depending on the developer's choice of predetermined decomposition processes.

Figure 3B:
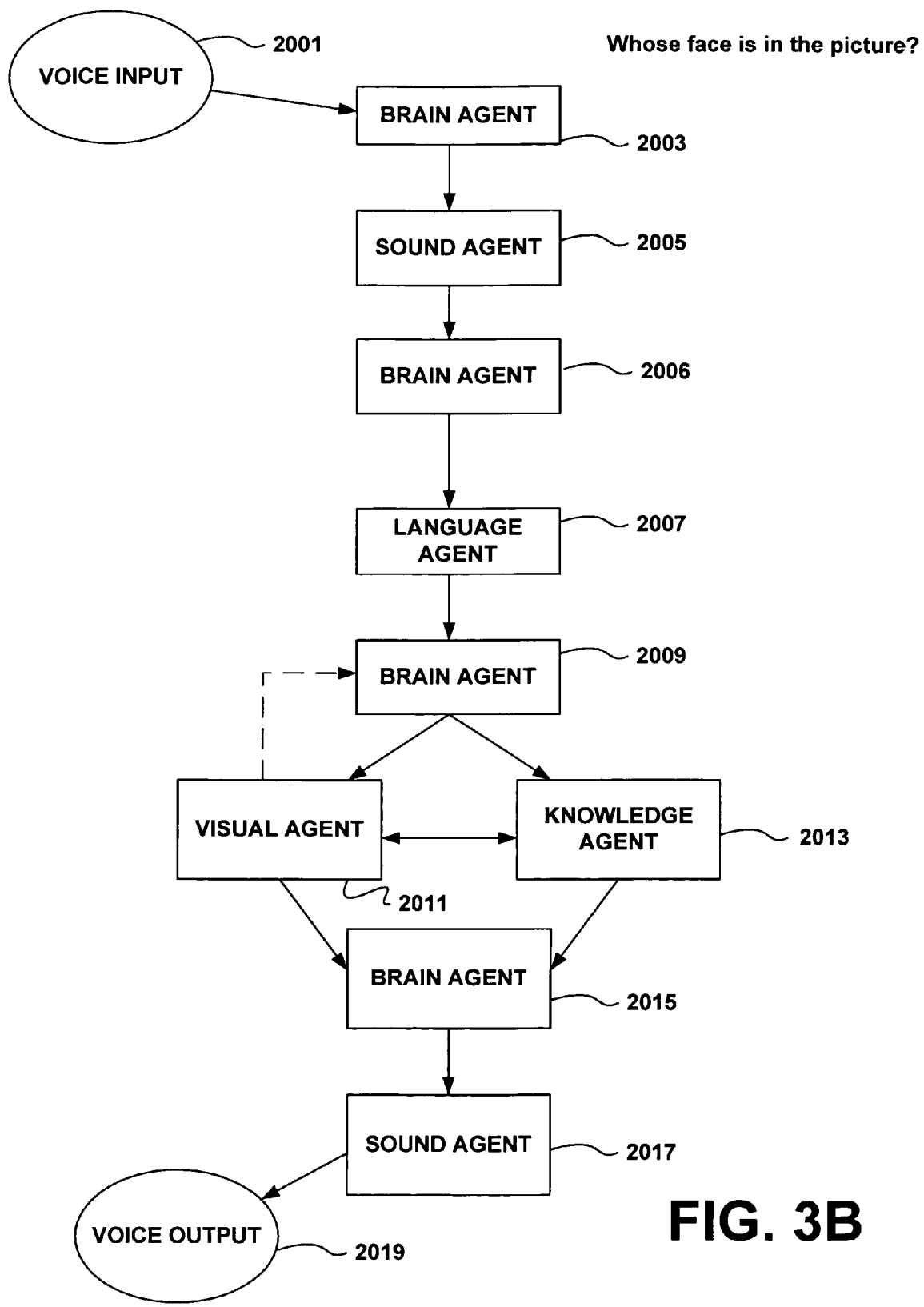
FIGS. 3B-3D are exemplary embodiments of decomposition methodologies according to various aspects of the present invention.
Figure 3C:
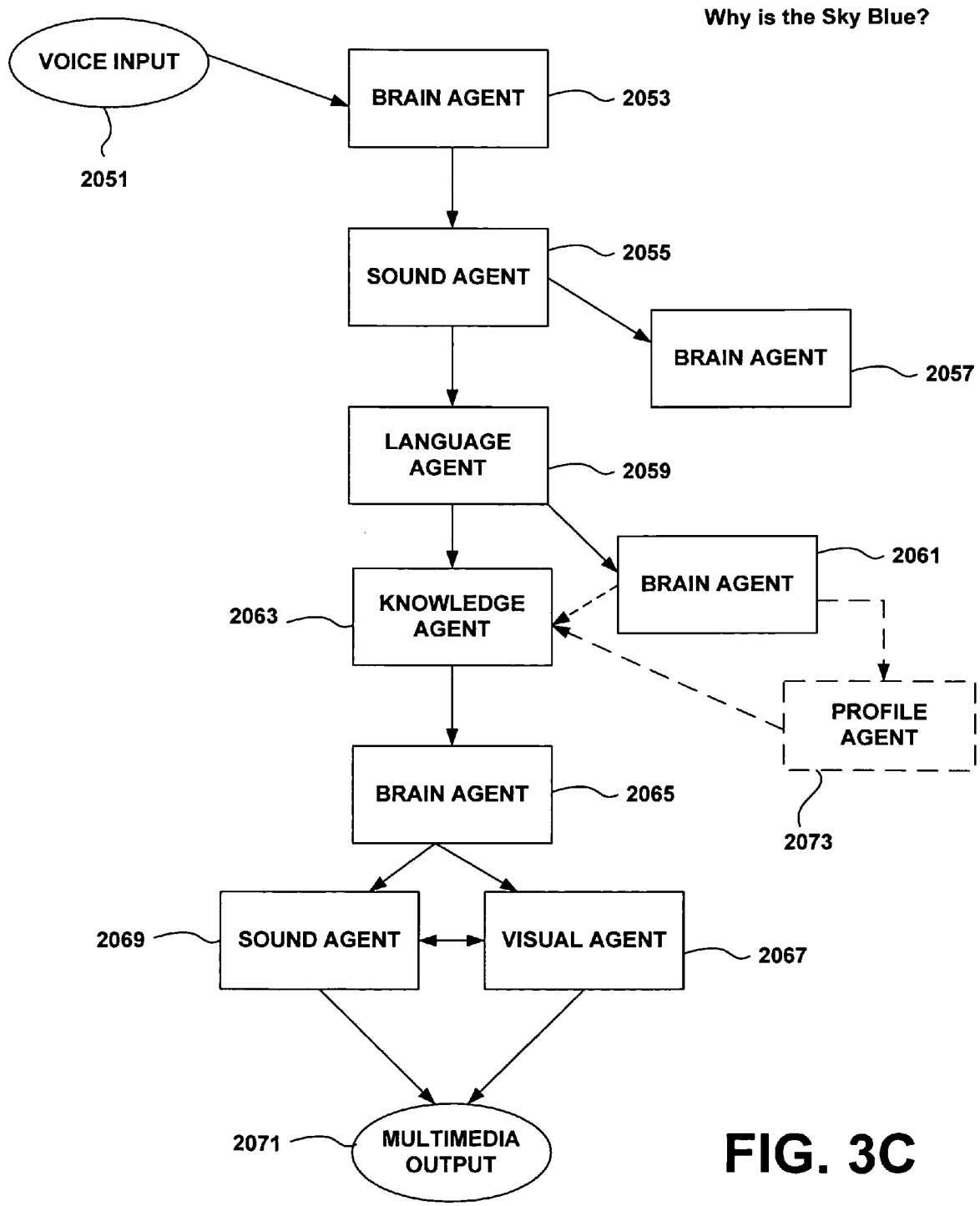
Figure 3D:
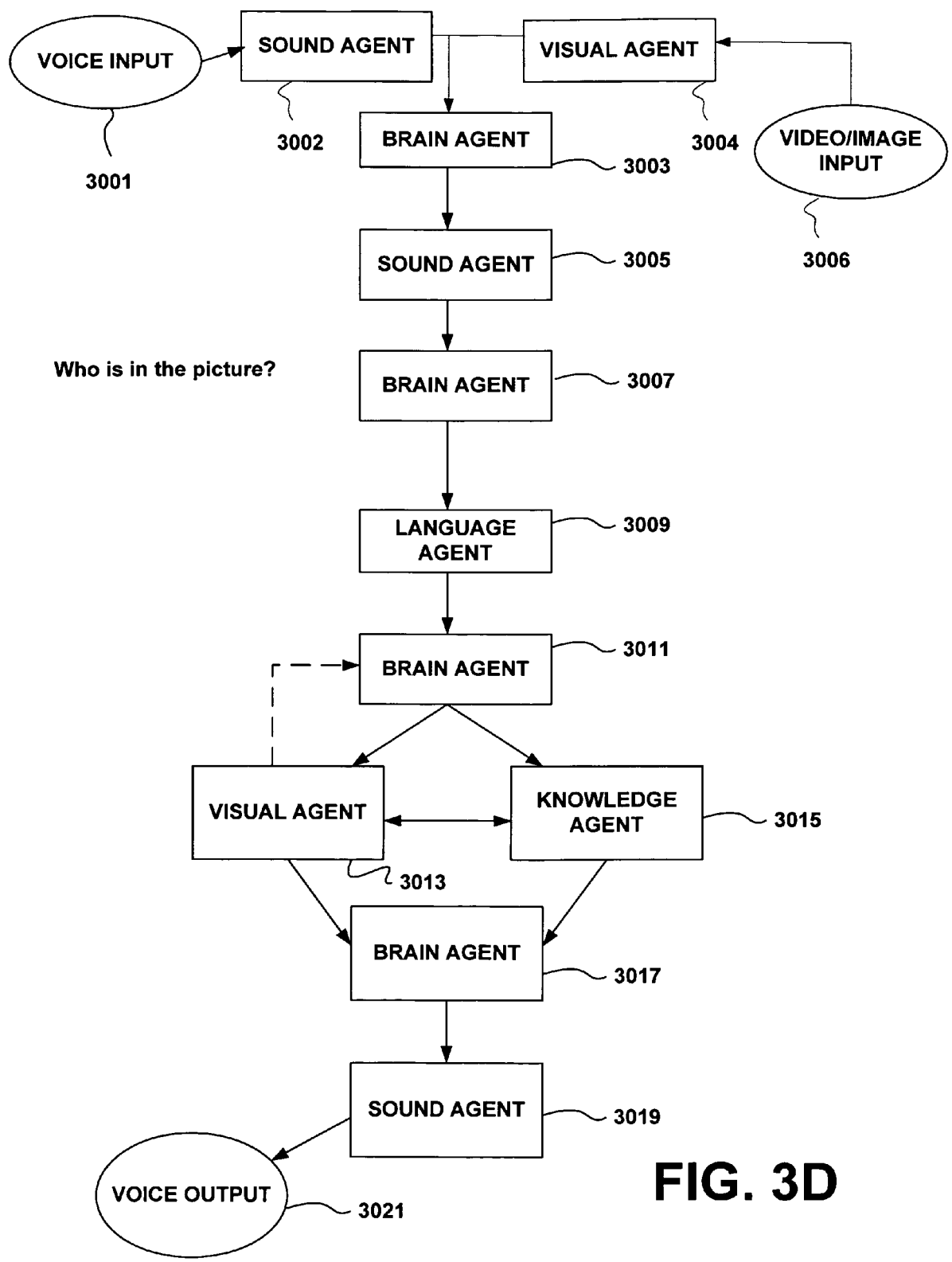

FIGS. 3B-3D show exemplary embodiments of decomposition methodologies according to the present invention. As shown in FIG. 3B, a user may ask a question such as, "Whose face is in the picture?" This question may be input into the system as a voice input 2001. The voice input 2001 may be input into the brain agent 2003. The brain agent 2003 may be configured to determine which decomposition process of a number of predetermined decomposition processes are to be employed based on the type of data received. Here, the data received is a voice input and may have one of a number of data formats associated with voice data. The brain agent 2003 may then determine that the predetermined decomposition process should employ the sound agent 2005 to assist in the decomposition of the input data. The sound agent 2005 may be configured to receive the input data in the form of a sound file and may convert the voice or sound file to a text file using any type of language processing available in the art. According to one embodiment of the present invention, the sound agent 2005 may then be configured to output the text file to the brain agent 2006. The brain agent 2006 may be configured to receive the text file and inspect it to ensure that all of the data from the input data has been converted into text. If all of the query-based input data has not been converted to text, the brain agent 2006 may be configured to output the unconverted data to the appropriate agent based on the predetermined decomposition step that has been determined based on the input data format.

In the exemplary embodiment of the decomposition step shown in FIG. 3B, the brain agent may be satisfied that all of the input data has been converted to text and may be configured to output the text to a language agent 2007. The language agent 2007 may be configured to conceptually parse the text as will be described in more detail below. Once the text has been conceptually parsed by the language agent 2007, the language agent 2007 may be configured to output the conceptually parsed data to the brain agent 2009, which may be configured to ensure that the text has been fully conceptually parsed, and may output the conceptually parsed data to the visual agent 2011 and the knowledge agent 2013. In the event that the input data did not include a image file, a video file or some other visual representation, the visual agent 2011 may relay an error message back to the brain agent, which may prompt the user for an image file. This may be done based on the particular query posed by the user. For example, the knowledge agent 2013 may determine that the user is requesting an image identification and may invoke the visual agent 2011. Once the visual agent 2011 fails to find an image file, it sends an error message to the brain agent 2009. If both the conceptually parsed text and the image file are present, the knowledge agent 2013 and the visual agent 2011 may be configured to interact with one another to determine the answer to the query. The visual agent 2011, as will be described in more detail below may be configured to perform pattern recognition processes and may interact with the knowledge agent 2013 to find an answer to the input query. Once an answer to the input query has been obtained, that answer, along with additional information such as a confidence factor may be output to the brain agent 2015 which may be configured to either request additional information from the user, request additional processing by the agents, or request that the agents interface, via the use of connectors with an outside data source or external intelligent system. If the brain agent 2015 is satisfied with the result (i.e., the confidence factor satisfies a predetermined threshold and the question has been completely resolved, the brain agent 2015 may be configured to compile the answer and output the answer to the question using the output peripherals associated with the sound agent 2017 to produce a voice output 2019. While voice output is described and shown in FIG. 3B. any type or types of output may be produced by the system. While not shown in FIG. 3B, the system may also be configured to employ the profile agent (not shown) in the event that the photograph is of the user.

While the term "predetermined decomposition process" may be used herein, the term predetermined decomposition process is used loosely to mean that the overall process that is initially determined by the brain agent is intended to be predetermined. If, however, any of the intelligent agents reports insufficient ability to answer a particular portion of the input query, the brain agent may invoke additional agents or modify the decomposition process on the fly. The term predetermined decomposition process therefore refers to the initial determined decomposition process that is determined based on the data formats that are inputted. The brain agent, if course is configured to modify this process on the fly to be able to answer the question.

FIG. 3C shows another exemplary decomposition process according to the present invention. As shown in FIG. 3C, the user may input a query to the system that asks "Why is the Sky Blue?" The input may be a voice input 2051. The voice input 2051 may be input into the brain agent 2053. The brain agent 2053 may be configured to determine the format(s) associated with the data received and implement a predetermined decomposition process. In the embodiment of the invention shown in FIG. 3C, the brain agent 2053 may be configured to output the input data to the sound agent 2055. The sound agent 2055 may be configured to covert the speech into text and output the text-to the language agent 2059. In the embodiment of the invention shown in FIG. 3C, the sound agent may be configured to report to the brain agent 2057 the results of the conversion (e.g., whether the sound was successfully converted or not) and may inform the brain agent 2057 where the text data was sent. In this example, the sound agent 2055 may be configured to report that the conversion was successful and that the text was sent to the language agent 2059. As described above, the language agent 2059 may be configured to conceptually parse the input text and may output this parsed data to the knowledge agent 2063. The language agent 2059 may then report to the brain agent 2061 the same type of information that was reported by the sound agent 2055. The brain agent 2061 may determine if this is the correct move, and if it is not, may issue an interrupt command.

In the exemplary embodiment of the invention shown in FIG. 3C, the brain agent 2061 may determine that for the input question "Why is the sky blue?" the proper place to send the text is the knowledge agent 2063. In a situation where the user inputs the question "What is my blood type?" The brain agent 2061 may be configured to interrupt the knowledge agent 2063 and substitute the profile agent 2073 in its place (this embodiment is illustrated by dashed lines in FIG. 3C). Referring back to the situation in which the input query is "Why is the sky blue?", the knowledge agent 2063 may be configured to provide an answer based on the parsed text to the brain agent 2065, which may activate the sound agent 2069 and the visual agent 2067 to output a multimedia output 2071 to the user. The term "decomposition" as used herein, as may be seen from preceding examples means any steps taken by the system to consider the various types of input data, format the data into an understandable format and provide an ultimate determination to the brain agent. This does not necessarily include the use of the various agents for outputting the answer or follow up questions to the user.

FIG. 3D shows yet another exemplary embodiment of a decomposition process of the present invention. In this embodiment, both a voice input 3001 and a video/image input 3006 are input into the system via peripherals associated with either the sound agent 3002 and the visual agent 3004, respectively. The video agent 3004 and the sound agent 3002 then relay the data to the brain agent 3003 which may be configured to identify the particular type of data that has been input. The brain agent 3003 may then invoke a predetermined decomposition method, as described above with respect to FIG. 3B. The predetermined decomposition method may include outputting the data from the brain agent 3003 to the sound agent 3005. The sound agent 3005 may covert the speech into text and may send the result back to the brain agent 3007. The brain agent 3007 may then output the data to the language agent 3009, which may conceptually parse the input and may output the conceptually parsed input to the brain agent 3011. The brain agent may then output data to the visual agent 3013 and the knowledge agent 3015 to determine the answer to the question. The brain agent 3017 may be configured to compile the data received from the knowledge agent 3015 and the visual agent and may utilize the sound agent 3019 (among others, if desired) to output voice output 3021 to the user. Any type of sensing agent, such as a smell or taste agent may be used in connection with this embodiment of the present invention.

2. Language Agent

Language agent 1020 may be implemented as processor-readable software code stored on a processor-readable medium. The language agent 1020 may be configured to function to handle the language aspects of the human question (query) posed by user 2000. Language agent 1020 may be used to determine the language employed by user 2000 to input the human question (e.g., English, French, Chinese, or Arabic), translate the language employed by user 2000 to input the human question into another language, parse the grammar of the human question, to interpret technical terms employed in the human question, and to interpret idioms and proverbs employed in the human question. Thus, the language agent 1020 may be configured to perform various normalization operations. Language agent 1020 also may be used to perform other linguistic functions including, without limitation, differentiating key words from non-important words (such as articles within the question) and understanding the importance of word orderings and pronoun references.

An exemplary use of the language agent 1020 to analyze speech input will now be described. The brain agent 1010 may be configured to receive a human question in the form of speech via, for example, a microphone. The brain agent 1010 may be configured to recognize that the input was speech and to send that data to the sound agent. The sound agent may then convert the sound into text. The text may then be returned to the brain agent and directed to the language agent 1020 for processing of the human question.

Parsing

Figure 4:
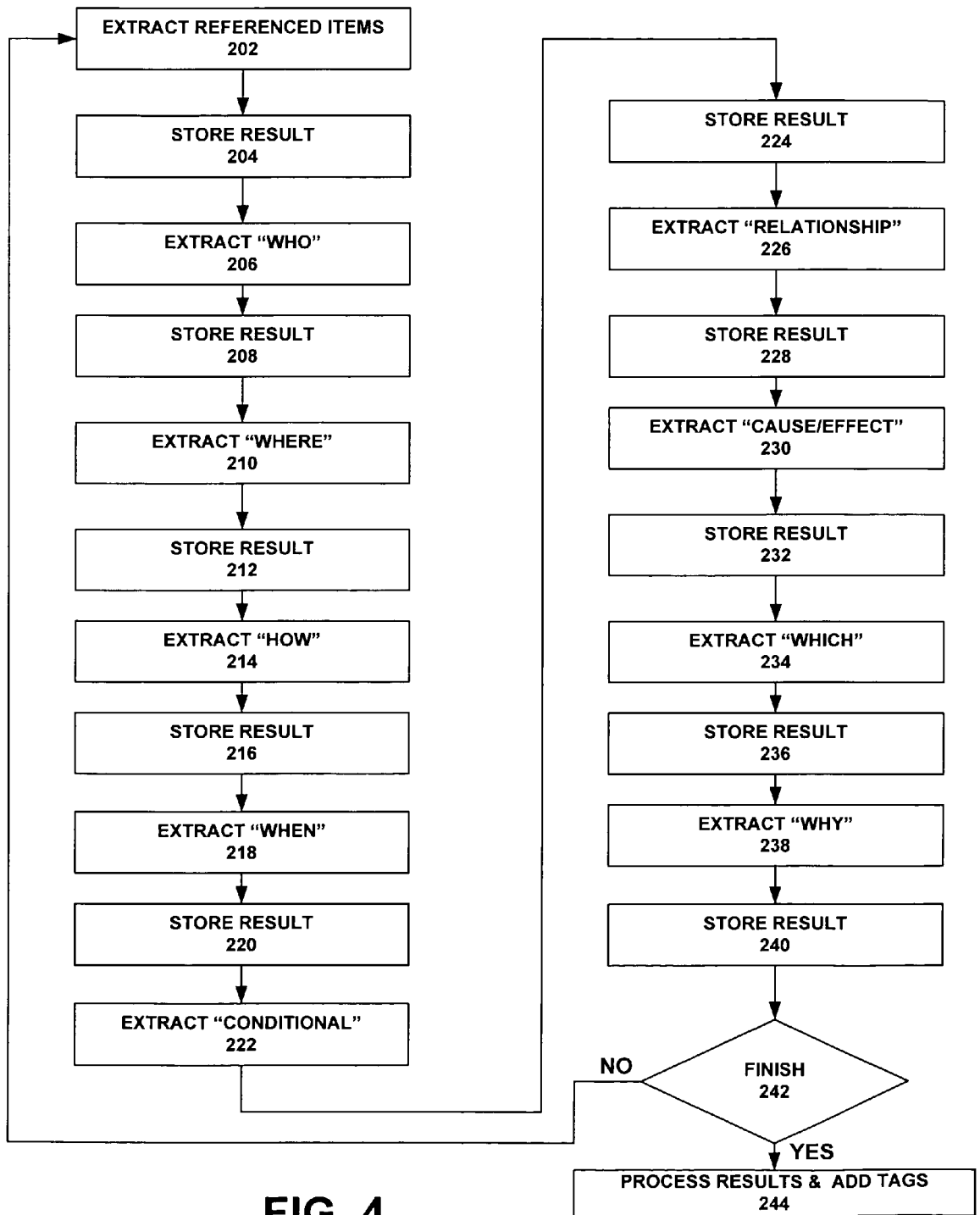
FIG. 4 shows a flow diagram of conceptual parsing according to an exemplary embodiment of the present invention.

Referring now to FIG. 4, a preferred embodiment of carrying out the parsing performed in step 200 of FIG. 3A is shown. As would be known to those skilled in the art, step 200 is not limited to the flowchart shown in FIG. 4, as any appropriate parsing method may be used according to the present invention. An example of one conventional method of parsing is provided in U.S. Pat. No. 5,309,359 to Katz et al., which is hereby incorporated by reference in its entirety.

FIG. 4 provides an example of "conceptual parsing" that may be carried out according to an exemplary embodiment of the present invention. Through conceptual parsing according to the present invention, a human question (or unstructured input query) may be parsed into fragments based upon the concepts presented in the human question rather than the grammatical structure of the human question. Conventional (linguistic) parsing typically is based upon the grammatical structure of the human question. Conventional parsing may be used according to the present invention, but the preferred embodiment of the present invention uses conceptual parsing, as discussed in detail below. The parsing steps described below may be replicated for each language (e.g., English, German, and Spanish). Alternatively, the human question could be translated into one "standard" language (e.g., English) before proceeding to the parsing steps. This translation into a uniform language may be part of a text normalization process.

When parsing, as well as conceptually parsing, a human question may be decomposed into fragments, and each fragment typically is attached to the right a respective tag. Tags used in conventional parsing are known to those skilled in the art. Tags used in the conceptual parsing of a human question into structured form may include, for example, the following: RELATIONSHIP:; CAUSE/EFFECT:; WHEN:; WHERE:; WHY:; HOW:; CONDITIONAL:; WHICH:; WHO:; and REFERENCE:. Note that as discussed below, there can be a plurality of structured form "sentences" mapped by a single question. Following are some examples of the conceptual parsing process according to the present invention. In the following examples, a question mark (?) indicates the subject of the question:

Human Question
1. Why is the sky blue?
Parsing Process
1(a). CAUSE/EFFECT: ?/blue sky
1(b). WHY:?Blue sky
(Note that 1(a) and 1(b) are two possible parsed results from the same human question 1.)
Human Question
2. Where is the closest airport?
Parsing Process
2. WHERE:?closest airport CONDITIONAL: <current location> (Note that angle brackets denote pointers.)

Human Question
3. Whose face is in the picture?
Parsing Process
3. WHO:? CONDITIONAL: face in the <video>
(Note that <video> references to the video source.)

Referring to FIG. 4, the preferred embodiment of carrying out step 200 of FIG. 3A will be explained. In step 202, one or more "referenced items" may first be extracted from the human question, and the referenced items may then be stored for later processing in step 204. In step 206, the "who" part of the human question may be extracted, and the "who" part may then be stored for later processing step 208. In step 210, the "where" part of the human question may be extracted, and the "where" part may then be stored for later processing in step 212. In step 214, the "how" part of the human question may be extracted, and the "how" part may then be stored for later processing step 216. In step 218, the "when" part of the human question may be extracted, and the "when" part may then be stored for later processing step 220. In step 222, the "conditional" part of the human question may be extracted, and the "conditional" part may then be stored for later processing step 224. In step 226, the "relationship" part of the human question may be extracted, and the "relationship" part may then be stored for later processing step 228. In step 230, the "cause/effect" part of the human question may be extracted, and the "cause/effect" part may then be stored for later processing step 232. In step 234, the "which" part of the human question may be extracted, and the "which" part may then be stored for later processing step 236. In step 238, the "why" part of the human question may be extracted, and the "why" part may then be stored for later processing step 240. In step 242, the human question may be analyzed to determine if further parsing might be necessary. If further parsing is necessary, the parsing process continues again at step 202, as shown by the looping of the process. If further parsing is not necessary, the process continues to step 244, where the parts extracted from the human question are processed and tags may be added. During the parsing process, brain agent 1010 may interact with one or more of the other intelligent agents, as appropriate. This may include functions such as sending the data, parameters and objective, and may also include the receipt of scores from the various agents. The brain agent may be configured to utilize feedback to the various other agents in the system to refine the score until it meets a predetermined score.

Referring to FIG. 3A, after the human question has been parsed in step 200, the results typically are output in a structured form (referred to as "S") in step 300.

3. Profile Agent

Profile agent may be embodied as processor-readable software code stored on a processor-readable medium. There may be different types of profiles, according to an exemplary embodiment of the invention. For example, one profile may include a physical profile and another can include an activity profile. Such long-term characteristics handled by personality agent 1040 include, without limitation, personality type (e.g., A or B), prejudice, bias, risk aversion (or lack thereof), political inclination, and religious beliefs. Examples of historical data of user 2000 handled by profile agent 1030 include, without limitation, educational background, occupational background, and locations where user 2000 has dwelled. The profile agent 1030 may be configured to handle the profile of the use of system 1000 by user 2000. Profile agent 1030 can store a history of the use by user 2000 of the present invention. For example, profile agent 1030 can maintain a "click by click" history of all activities engaged in by user 2000 while using the present invention. Profile agent 1030 may likewise perform a "clickstream analysis" of the activities engaged in by user 2000 to determine the preferences of user 2000 and the underlying intentions of user 2000 for using the present invention.

Profile agent 1030 may interact with error handling agent 1090 to determine proper error compensation before user 2000 is prompted for clarification. Profile agent 1030 also may be used to gather user profile information including, without limitation, subject categories of interest to user 2000 based on past questions posed by user 2000 and the preferable form of presentation to user 2000 based upon whether user 2000 is more visual or auditory at perception. Examples of long term characteristics handled by profile agent 1030 include biometric data concerning the user including, but not limited to, height, weight, hair color, eye color, retinal pattern, fingerprints, and DNA.

4. Personality Agent

Personality agent 1040 may be stored as processor-readable software code stored on a processor-readable medium. The personality agent may be configured to handle the long term characteristics and historical data concerning user 2000. The personality agent may be configured to deal with the personality of a user. This may include any trait that does not fit within the category for the profile agent. As described above, the personality agent may be configured to determine a user profile, including personality profiles during the training phase This may be done using, for example, an interviewing type process.

Personality agent 1040 may gather long term character traits and historical data concerning user 2000 during the registration process (discussed below) for use in identifying user 2000 during the login process (discussed below). Personality agent 1040 also may gather long-term character traits and historical data concerning user 2000 during use by user 2000 of the present invention. Personality agent 1040 also may be used to notify brain agent 1010 when drastic changes in the personality profile of user 2000 are detected.

5. Knowledge Agent

The knowledge agent 1050 may be configured as processor-readable software code stored on a processor-readable medium. Knowledge agent 1050 may be configured to handle factual information that is not specific to user 2000. Such factual information handled by knowledge agent 1050 may include, without limitation, facts concerning mathematics, science, history, geography, literature, current events, and word relationships such as synonyms, antonyms, and homonyms. According to one exemplary embodiment of the present invention, knowledge agent 1050 may know that "July 4" is a U.S. Holiday and that the Boston Tea Party has a significant historical context, for example. The knowledge agent may be configured to interface with one or more databases including data to answer the human question.

Matching

Figure 5:
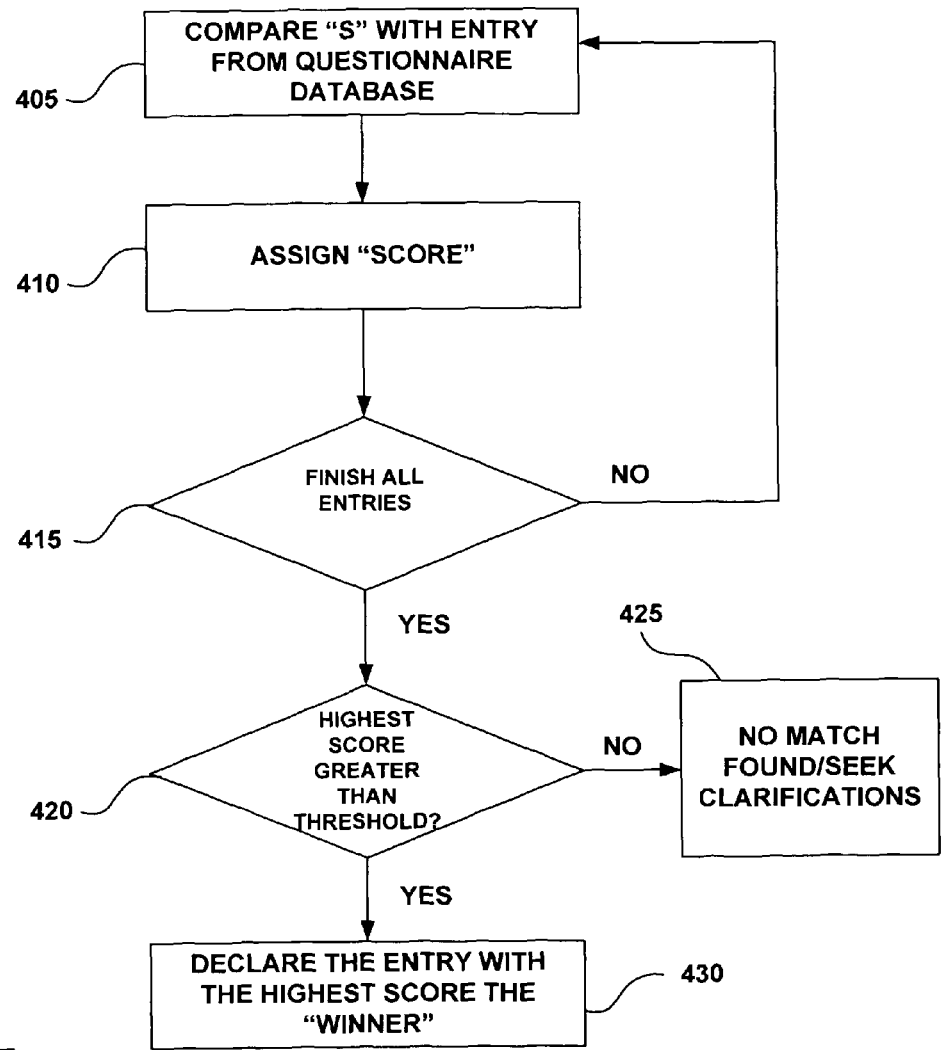
FIG. 5 shows a flow diagram of matching according to an exemplary embodiment of the present invention.

As shown in FIG. 3A, during step 400 the present invention may be configured to try to match S with another structured-form entry from a questionnaire database 1210 (shown in FIG. 2). Referring to FIG. 5, a preferred method for matching S with another structured-form entry is shown. As would be known to one skilled in the art, the matching process of the present invention is not limited to that shown in FIG. 5. Various other methods for matching may be used according to the present invention, including, without limitation, those discussed in Gerard Salton, *Automatic Information Retrieval*, IEEE Computer, September 1980, at 41-56 and Chung-Shu Yang and Gerard Salton, *Best-Match Querying in General Database Systems—A Language Approach*, IEEE Computer Society's Second International Computer Software and Applications Conference, at 458-63 (1978), both of which are incorporated herein by reference.

In step 405, S may be compared with entries stored in a questionnaire database 1210 (shown in FIG. 2). As the entries are compared with S, a score may be assigned to each entry in step 410. In step 415, the present invention may be configured to determine whether all entries from questionnaire database 1220 have been compared with S. If all entries have been compared, the matching process may proceed to step 420. If all entries have not been compared, the matching process may return to step 405. After all entries have been compared with S, the scores of all entries may be compared with a "threshold" score in step 420. If none of the scores for any entry exceed the threshold score, the matching process may continue to step 425. In step 425, brain agent 1010 may seek clarification from user 2000 so that entries exceeding the threshold score may be located. If the scores for one or more of the entries exceeds the threshold, the matching process continues to step 430. In step 430, the entry with the highest score may be declared the "winner," and the "winning" entry is referred to as "M."

6. Mood Agent

The mood agent 1060 may be configured as processor-readable software code stored on a processor-readable medium. Mood agent 1060 may be configured to handle information concerning the temporary emotional state of user 2000 while user 2000 is interacting with the present invention. Mood agent 1060 interacts with the other intelligent agents to gather information related to the temporary emotional state of user 2000. Mood agent 1060 may be analyze input from user 2000 for sarcasm, tone, and diction to determine the temporary emotional state of user 2000. Mood agent 1060 also can analyze the facial expression of user 2000 to determine the temporary emotional state of user 2000. Mood agent 1060 may be used to provide information related to the temporary emotional state of user 2000 to the other intelligent agents for use in interpreting the human questions and providing human answers to user 2000. For example, when mood agent 1060 detects that user 2000 is inattentive or nervous, mood agent 1060 would signal brain agent 1010 or one or more of the other intelligent agents to relay information to user 2000 slowly and redundantly to avoid possible misinterpretation that potentially could result from the state of mind of user 2000. For example, this could be carried out by examining voice samples of the speaker. The voice sample characteristics could be compared to previous historical characteristics at different moods to get a score. The voice sample characteristics could also be compared to characteristics of the population at different moods to get another score. Still another score could be generated by fusing the previous two scores by various conventional fusing algorithms.

7. Visual Agent

The visual agent 1070 may be configured as processor-readable software code stored on a processor readable medium. Visual agent 1070 may be configured to handle visual information that is input by user 2000. Visual agent 1070 may be configured to perform functions including, but not limited to: object recognition; scene analysis; face identification; color recognition; shape recognition; texture recognition; lighting recognition; age detection; and gender identification. For example, the question "Where is the closest airport?" by user 2000 may trigger visual agent 1070 to perform scene analysis of the background of the video image (if available) of user 2000. Such analysis may yield landmark information and other clues regarding where user 2000 is located, thus helping to answer the human question posed by user 2000.

According to one exemplary embodiment of the present invention, the visual agent 1070 may be configured to determine that a particular image is an apple. Furthermore, the visual agent 1070 may be configured to inform the brain agent 1010 that the image cannot be identified. Furthermore, the visual agent 1010 may be configured to determine that a particular object is a certain distance away from another object. Other exemplary types of information that may be determined by the visual agent 1070 include the speed of moving objects, the color of the objects, the size of an object, retinal scans and identification of the individual. All of this information may be output by the visual agent 1070 to the brain agent 1010.

The inputs into the visual agent 1070 may include, for example, video cameras, optical scanners, x-ray sensors, electromagnetic sensors, radar equipment, LADAR/LIDAR equipment. Various outputs may include, for example, CRT outputs, television outputs, printer output, x-ray actuators, and electromagnetic actuators. Any type of visual inputs and outputs may be used in connection with the present invention.

8. Sound Agent

The sound agent 1080 may be configured as processor-readable software code stored on a processor-readable medium. Sound agent 1080 may be configured to handle audio information that is input by user 2000. Sound agent 1080 may perform functions including, but not limited to: voice-to-text translation; accent detection; gender identification; age detection; speech rate detection; voice identification; sound recognition; and volume detection. For example, brain agent 1010 will launch sound agent 1080 when user 2000 will provide voice input. Sound agent 1080 may be used to translate the voice input from user 2000 into text, and then provide the text to the other intelligent agents as appropriate. As another example, sound agent 1080 may be used to detect whether user 2000 speaks with an accent, and then may determine the geographic region that the detected accent in indigenous to, if possible. In detecting the accent of user 2000, sound agent 1080 may collaborate with one or more of the other intelligent agents. For example, sound agent 1080 may collaborate with knowledge agent 1050 to determine the region that the accent of user 2000 is indigenous to. Sound agent 1080 also may collaborate with personality agent 1040 to determine whether long term character traits of user 2000 match character traits typically associated with the detected accent. In addition, sound agent 1080 may also be used to recognize inanimate sounds including, without limitation, thunder, an explosion, music, and animal sounds.

The sound agent may be configured to output information such as, for example, that the particular language being spoken is Chinese and the dialect is Mandarin, that the sound is unidentifiable, that one sound is louder than another, that a dog was barking in the input sound, that the particular input speech is Mr. Doe's voice, that the sound is fading, that the speaker is female or male. The sound agent may be associated with a microphone as an input peripheral and may have speakers as an associated sound output.

9. Tactile Agent

The tactile agent 1083 may be configured as processor-readable software code stored on a processor readable medium. Tactile agent 1083 may be configured to handle tactile information that is input by user 2000. Tactile agent 1083 may perform functions including, but not limited to, the following: pressure sensing, temperature sensing, moisture sensing, and texture sensing. For example, user 2000 can input text, data, and drawings by writing on a pressure-sensitive pad or motion-position detection apparatus, and tactile agent 1083 may be used to decipher this input. Tactile agent 1083 likewise could be used to register the signature of user 2000 along with any pressure and temporal information associated with the signature. The following questions provide examples of how tactile agent 1083 may be used according to the present invention: "What is the room temperature?" "Where is the crack on this object?" "Is the humidity in this room greater than 72%?" Questions such as the foregoing may trigger tactile agent 1083 to perform the appropriate tactile processing in whole or in part with other intelligent agents as appropriate.

Exemplary input peripherals for the tactile agent 1083 may include, for example, heat sensors, motion sensors (e.g., infrared sensors, virtual gloves, joysticks, computer mouse etc.), keyboards, pressure sensors, humidity sensors, weight sensors. Outputs from the system, and particularly associated with the tactile agent 1083 include, for example, weight actuators, humidity actuators, pressure actuators, motion actuators, heat actuators. Various other peripheral devices will be readily identified by those of skill in the art. The listing of peripheral devices associated with the particular agents as described herein are by way of example only, and not by limitation.

10. Smell/Taste Agent

The smell/taste agent 1085 may be configured as processor-readable software code stored on a processor-readable medium. The smell/taste agent 1085 may be used to process olfactory or other chemical information that is input by user 2000. Smell/taste agent 1085 may perform functions including, but not limited to, scent detection, smell identification, and chemical analysis. For example, user 2000 may input olfactory information by breathing into a tube for breath analysis. This olfactory information could be utilized by the present invention for the purposes of registering the olfactory signature of user 2000 and/or detecting the amount of alcohol or other drugs in the body of user 2000. Other examples of uses of smell/taste agent 1085 according to the present invention are illustrated with the following questions: "Is there poisonous gas in the room?" "Do I have bad breath?" "Is there any illegal substance in the luggage?" "What perfume is she wearing?" These questions may trigger smell/taste agent 1085 to perform the appropriate olfactory or other chemical processing in whole or in part with other intelligent agents as appropriate. Inputs into the smell/taste agent may include, for example, chemical sensors and outputs from the smell/taste agent 1085 may include chemical actuators. The smell/taste agent may be configured to inform the brain agent 1010 that a particular gas sample has $NH_3$ in it, that one sample is sweeter than another, that the liquid contains a high amount of lead, that a particular sample smells like a flower.

11. Error Handling Agent

Error handling agent 1090 functions to compensate for errors that are present in the input received from user 2000. Such errors may include, without limitation, typos, noisy images or video data, occluded images or video data, and grammatical errors. While error handling agent 1090 is shown as a separate component in FIG. 2, an error handling agent may be incorporated into each of the other intelligent agents.

For example, language agent 1020 may incorporate an error handling agent (not shown) to compensate for language errors. The language errors that the error handling agent (not shown) may be utilized to compensate for include, without limitation, spelling and grammatical errors, typos, and unclear language such as the use of double negatives, pronouns with an indefinite antecedent basis, or slang.

Error handling agent 1090 may be configured to automatically compensate for mistakes without further clarification from user 2000 when a high confidence level exists that the compensation should be made. Error handling agent 1090 may interact with the other intelligent agents, such as profile agent 1030 and personality agent 1040, to determine the confidence level for error compensation. Error handling agent 1090 may prompt user 2000 via brain agent 1010 for clarification when confidence in the error compensation is low or compensation for the error cannot be determined.

The other intelligent agents likewise may include individual error handling agents to compensate for errors in the data received from user 2000. As with the example of the error handling agent incorporated into language agent 1020, the error handling agents incorporated into the other intelligent agents will communicate with the other intelligent agents to determine whether a correction to an error should automatically be made. When the confidence level is low concerning an automatic correction, user 2000 typically will be prompted for addition information to determine how the error should be corrected.

12. Connectors

The present invention may also include one or more connectors to enable system 1000 to communicate with external data sources (including, without limitation, other parallel implementations of the present invention) for assistance in providing output to user 2000. These connectors may permit each intelligent agent to supplement the information contained within each intelligent agent and to seek assistance from external data sources when the information contained within system 1000 is insufficient to address a human question posed by user 2000. These connectors likewise may be used in the alternate embodiments of the present invention described above. While each individual agent may include its own connector or connectors to communicate with outside sources, it is preferable to provide one or more connectors interfaced with brain agent 1010 as shown in FIG. 2, thereby providing a centralized interface for each intelligent agent to communicate with external data sources.

Connectors that may be used according to the present invention include, without limitation, database connector 1110, AI engine connector 1120, KIF connector 1130, and KQML connector 1140. Each of the foregoing connectors may allow any of the intelligent agents to communicate with an external data source. As would be known to those skilled in the art, various other connectors to external data sources also may be employed according to the present invention. Database connector 1110 enables any of the intelligent agents to communicate with external databases. AI connector 1120 enables any of the intelligent agents to communicate with external AI engines including, without limitation, the Cyc system discussed above. KIF connector 1130 enables any of the intelligent agents to communicate with external data sources that use the KIF protocol. KQML connector 1140 enables any of the intelligent agents to communicate with external data sources that use the KQML protocol. Yannis Labrou, Tim Finin, and Yung Peng, *Agent Communication Languages: The Current Landscape*, IEEE Intelligent Systems, March/April 1999, at 45-52, provides information related to the various communication languages that may be employed by the intelligent agents of the present invention when communicating with external data sources as well as with one another.

13. Login Process

Figure 7:
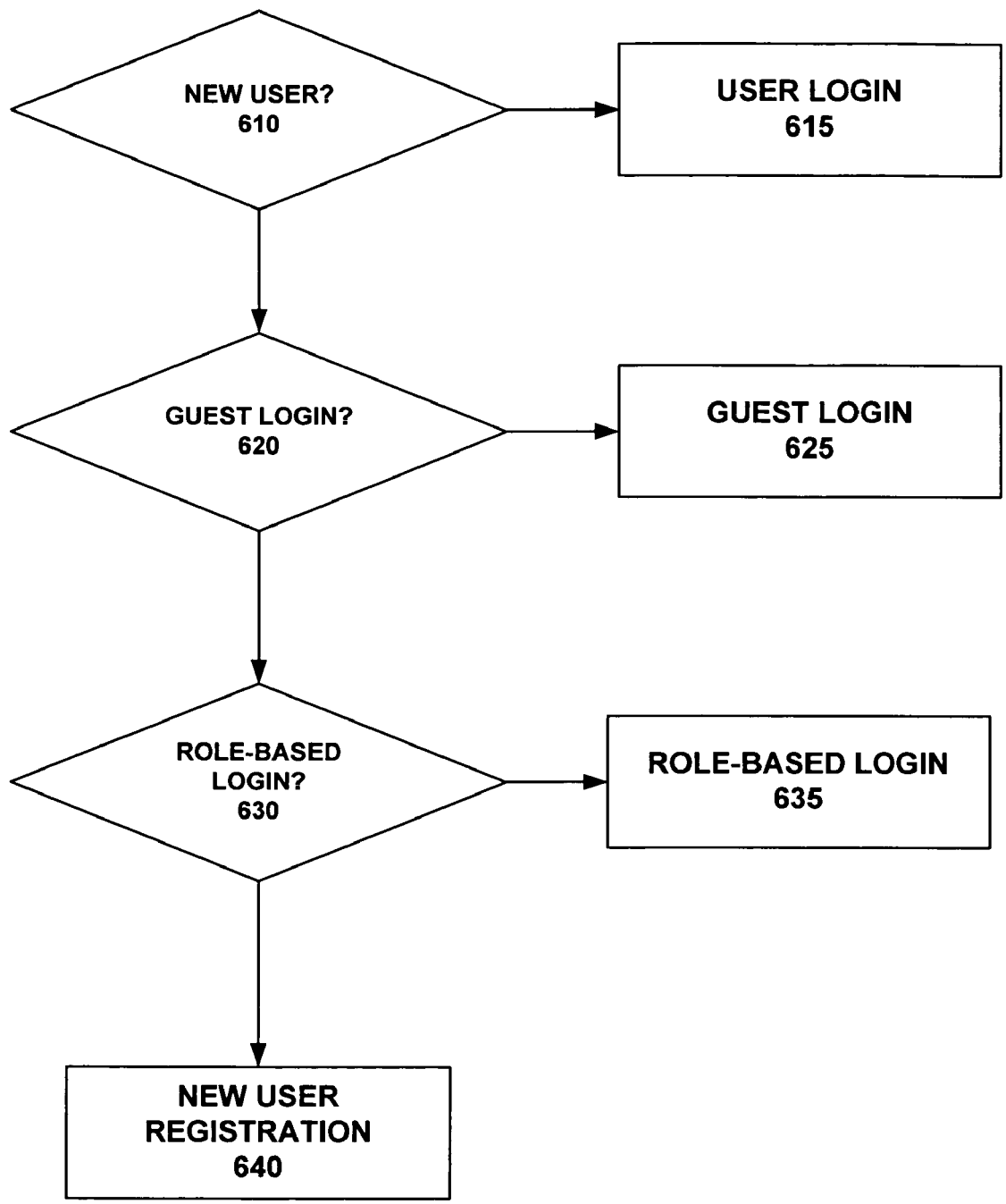
FIG. 7 shows a flow diagram of an exemplary user-login process according to an exemplary embodiment of the present invention.

Referring now to FIG. 7, a flow diagram is shown for various login modes that may be used according to the present invention. As would be known to one skilled in the art, various other login modes may be used, and the present invention is not limited to those shown in FIG. 7. In addition, the login process shown in FIG. 7 is not limited to either the steps or order indicated. In step 610, the present invention determines whether user 2000 already has a user-specific account to use the present invention. If user 2000 already has a user-specific account, in step 615 user 2000 will login to use the present invention. This login process is described 10 below.

If user 2000 does not have a user-specific account to use the present invention (i.e., is a new user), in step 620 user 2000 will be given the option of using a guest login account. If user 2000 elects to use a guest login account, in step 625 user 2000 is provided access to the present invention with a guest login account. When using a guest login account, user 2000 would not benefit from any personalization that could be used in interpreting the human question and constructing the human answer. If user 2000 elects not to use a guest login account, in step 630 user 2000 will be given the option of using a role-based login account. If user 2000 elects to use a role-based login account, in step 635 user 2000 will be provided access to the present invention with a role-based login account. When using a role-based account, user 2000 may select a role from a list of representative role personalities; this would provide a stereotypical and partial personalization of user 2000 for use in interpreting the human question and constructing the human answer.

If user 2000 elects not to use a role-based account, in step 640 user 2000 will be given the option of obtaining a user-specific account by registering to use the present invention. The registration process of step 640 is described in detail below. After user 2000 has registered to obtain a user-specific account, or if user 2000 elects not to register, the login process returns to step 610.

The registration process of step 640 typically utilizes a variety of media and preferably serves to collect information regarding user 2000 that will enable the present invention to confirm the identity of user 2000 during later use and to prevent others from masquerading as user 2000 while using the present invention. The registration process of step 640 also typically may be used to collect information for use by personality agent 1040. Through brain agent 1010, the intelligent agents 10 will prompt a new user 2000 with a variety of questions and other information requests to register user 2000 with system 1000. Questions posed to user 2000 during the registration process may include, without limitation, the user's name, address, birth date, and educational background. The system may also ask personality test questions including, without limitation, questions concerning the user's political beliefs, religious beliefs, and other subject matters that may be used to discern personality traits of the user.

During the registration process, the present invention also may ask the new user 2000 to provide information for use in confirming the identity of the new user during subsequent interaction with system 1000. The user may be prompted to provide biometric information including, without limitation, a voice sample, a fingerprint sample, a snapshot of the user's face, an image of the blood vessels of the user's retina, a scan of brain waves, or a DNA sample. In addition to being used for identification purposes, this information may be utilized by the intelligent agents to supplement the user's personality profile and for other purposes.

Once the new user has provided information sufficient to confirm the identity of the user during subsequent interaction with system 1000, the new user will be issued a user-specific login account and password for subsequent use.

14. User Interaction

Once a new user 2000 has been issued a user-specific login account and password, this user 2000 may interact with system 1000. User 2000 will input his or her user-specific login account and password. System 1000 also may ask user 2000 to provide additional information such as a fingerprint, retinal scan, real time facial snapshot, voice sample, or other information that may be used to confirm the identity of user 2000. Once the identity of user 2000 has been confirmed, system 1000 will prompt the user to select an input mode such as text, voice or other audio, or visual input. System 1000 will then prompt user 2000 to input a human question. User 2000 may also interact with the present invention using either a guest login or role-based login, as discussed above. However, when using a guest login account, user 2000 would not benefit from any personalization. In addition, when using a role-based login, user 2000 would benefit only from stereotypical and partial personalization.

Brain agent 1010 may then receive the human question input by user 2000. Once the human question is received, brain agent 1010 will launch the appropriate intelligent agents to be used in interpreting the human question (as discussed above) and, later, in constructing a human answer. The appropriate intelligent agents will receive the human question and refine the question into one or more simpler questions that can be interpreted using machine intelligence. The intelligent agents may interact with one another as the human question is interpreted. In one aspect of the invention, personality agent 1040, profile agent 1030, and mood agent 1060 typically may play important roles in assisting the other intelligent agents to interpret the human question because these agents may be used to put the human question into context from the perspective of user 2000. As discussed above, brain agent 1010 functions to coordinate the interaction between the various intelligent agents.

While the human question may be interpreted by one or more of the intelligent agents, one or more of the intelligent agents may prompt user 2000 for additional information to clarify the human question or to correct an error that could not be automatically corrected by error handling agent 1090. In addition, one or more of the intelligent agents may utilize one or more of the connectors including database connector 1110, AI engine connector 1120, KIF connector 1130, or KQML connector 1140 to obtain information or assistance that is available external to system 1000.

Through the interaction of the various intelligent agents, a human answer is constructed in response to the human question input by user 2000. Brain agent 1010 transmits the human answer to user 2000 in the media format requested by user 2000. After user 2000 has received the human answer, system 1000 may prompt the user to evaluate the human answer for clarity, relevance, and other factors that may be used to assess the performance of the present invention.

System 1000 may then prompt user 2000 to input another human question or to log-off from the system. Either during the interaction with user 2000 or after user 2000 has logged-off, system 1000 may update the information stored in profile agent 1030, personality agent 1040, and any of the other intelligent agents that may benefit from the data exchanged during the interaction with user 2000.

Thus, there has been described an apparatus and method for problem solving using intelligent agents. In one aspect of the present invention, intelligent agents that are dedicated to specific functions interact with a brain agent to provide human answers in response to human questions. In another aspect of the present invention, the human question is parsed in a conceptual manner. In yet another aspect of the present invention, the personality and other characteristics specific to the individual user interacting with the present invention are utilized when composing the human answer.

Whereas the present invention has been described with respect to specific embodiments thereof, it will be understood that various changes and modifications will be suggested to one skilled in the art and it is intended that the invention encompass such changes and modifications as fall within the scope of the appended claims

What is claimed is:

1. A system for problem solving, comprising:
   a brain agent configured to receive input data representing an input query from a peripheral device, the brain agent configured as processor-readable software code stored on a processor readable medium, the brain agent being configured to identify a predetermined data format associated with the input data and invokes a decomposition process associated with that predetermined data format, the decomposition step including outputting the data to a first intelligent agent configured as processor-readable software code stored on a computer readable medium, and the brain agent being configured to receive the input data in a textual form and conceptually parse the input data in textual form and a plurality of sub-queries; and
   a plurality of second intelligent agents, each configured to receive at least one of the plurality of sub-queries and the corresponding conceptually parsed text and provide responsive output to the brain agent based on the conceptually parsed text;
   the brain agent being further configured to generate an answer to the input query based upon at least the responsive output of the plurality of second intelligent agents.

2. The system as recited in claim 1, the first intelligent agent being a language agent and at least one of the second agents being a knowledge agent.

3. The system as recited in claim 1, further comprising:
   a plurality of input peripheral devices;
   an input/output interface, whereby the brain agent interacts with the input/output interface to receive an input signal representing an input query and provide an output in response via the input/output interface.

4. The system as recited in claim 1, the first intelligent agent being a language agent and the second agent being a knowledge agent, the system further comprising:
   a connector, the connector being embodied as processor-readable software code stored on a processor-readable medium, the connector being configured to facilitate selective interaction between one or more of said language agent and said knowledge agent with one of an external data structure and an external intelligent system.

5. The system as recited in claim 1, further comprising:
   a personality agent configured as processor-readable software code stored on a processor readable medium, and wherein
   said brain agent is further adapted to selectively interact with said personality agent to interpret the input query and provide output in response to the input query.

6. The system as recited in claim 5, further comprising:
   a connector, the connector being embodied as processor-readable software code stored on a processor-readable medium, the connector being configured to facilitate selective interaction with the personality agent with one of an external data structure and an external intelligent system.

7. The system as recited in claim 1, further comprising:
   an error handling agent configured as processor-readable software code stored on a processor-readable medium, and wherein said brain agent is further adapted to selectively interact with said error handling agent to interpret the input query and to provide output in response to the input query.

8. The system as recited in claim 7, further comprising:

a connector, the connector being embodied as processor-readable software code stored on a processor-readable medium, the connector being configured to facilitate selective interaction with the error-handling agent with one of an external data structure and an external intelligent system.

9. The system as recited in claim 1, further comprising:

a profile agent configured as processor-readable software code stored on a processor readable medium, and wherein said brain agent is configured to selectively interact with said profile agent to interpret the input query and to provide output in response to the input query.

10. The system as recited in claim 9, further comprising:

a connector, the connector being embodied as processor-readable software code stored on a processor-readable medium, the connector being configured to facilitate selective interaction with the profile agent with one of an external data structure and an external intelligent system.

11. The system as recited in claim 1, further comprising:

a mood agent configured as processor-readable software code stored on a processor-readable medium, and wherein said brain agent is further adapted to selectively interact with said mood agent to interpret the input query and to provide output in response to the input query.

12. The system as recited in claim 11, further comprising:

a connector, the connector being embodied as processor-readable software code stored on a processor-readable medium, the connector being configured to facilitate selective interaction with the mood agent with one of an external data structure and an external intelligent system.

13. The system as recited in claim 1, further comprising:

a visual agent configured as processor-readable software code stored on a processor readable medium, and wherein said brain agent is further adapted to selectively interact with said visual agent to interpret the input query and to provide output in response to the input query.

14. The system as recited in claim 13, further comprising:

a connector, the connector being embodied as processor-readable software code stored on a processor-readable medium, the connector being configured to facilitate selective interaction with the visual agent with one of an external data structure and an external intelligent system.

15. The system as recited in claim 1, further comprising:

a sound agent configured as processor-readable software code stored on a processor readable medium, and wherein said brain agent is further adapted to selectively interact with said sound agent to interpret the input query and to provide output in response to the input query.

16. The system as recited in claim 15, further comprising:

a connector, the connector being embodied as processor-readable software code stored on a processor-readable medium, the connector being configured to facilitate selective interaction with the sound agent with one of an external data structure and an external intelligent system.

17. The system as recited in claim 1, further comprising:

a tactile agent configured as processor-readable software code stored on a processor readable medium, and wherein said brain agent is further adapted to selectively interact with said tactile agent to interpret the input query and to provide output in response to the input query.

18. The system as recited in claim 17, further comprising:

a connector, the connector being embodied as processor-readable software code stored on a processor-readable medium, the connector being configured to facilitate selective interaction with the tactile agent with one of an external data structure and an external intelligent system.

19. The system as recited in claim 1, further comprising:

a smell/taste agent configured as processor-readable software code stored on a processor readable medium, and wherein said brain agent is further adapted to selectively interact with said smell/taste agent to interpret the input query and to provide output in response to the input query.

20. The system as recited in claim 19, further comprising:

a connector, the connector being embodied as processor-readable software code stored on a processor-readable medium, the connector being configured to facilitate selective interaction with the smell/taste agent with one of an external data structure and an external intelligent system.

* * * * *